(12) United States Patent
Hall et al.

(10) Patent No.: US 8,375,734 B2
(45) Date of Patent: Feb. 19, 2013

(54) FRESH FOOD ICE MAKER CONTROL

(75) Inventors: David L. Hall, Piedmont, SC (US); James Scoville, Anderson, SC (US)

(73) Assignee: Electrolux Home Products, Inc., Cleveland, OH (US)

( * ) Notice: Subject to any disclaimer, the term of this patent is extended or adjusted under 35 U.S.C. 154(b) by 1029 days.

(21) Appl. No.: 12/394,412

(22) Filed: Feb. 27, 2009

(65) Prior Publication Data
US 2010/0218519 A1  Sep. 2, 2010

(51) Int. Cl.
*F25B 41/04* (2006.01)

(52) U.S. Cl. .................. 62/225; 62/222; 62/224; 62/73; 62/157

(58) Field of Classification Search .................... 62/222, 62/224, 225, 157
See application file for complete search history.

(56) References Cited

U.S. PATENT DOCUMENTS

| | | | |
|---|---|---|---|
| 2,315,460 A | 3/1943 | Steenstrup | |
| 2,866,322 A | 12/1958 | Muffly | |
| 4,147,039 A | 4/1979 | Blomberg | |
| 4,523,435 A * | 6/1985 | Lord | 62/212 |
| 4,571,951 A | 2/1986 | Szymaszek | |
| 4,745,767 A | 5/1988 | Ohya et al. | |
| 4,774,815 A | 10/1988 | Schlosser | |
| 4,848,099 A | 7/1989 | Beckey et al. | |
| 4,907,422 A | 3/1990 | Kohl et al. | |
| 5,375,432 A | 12/1994 | Cur | |
| 5,406,805 A | 4/1995 | Radermacher et al. | |
| 6,460,357 B1 | 10/2002 | Doi et al. | |
| 6,735,959 B1 | 5/2004 | Najewicz | |
| 6,775,998 B2 | 8/2004 | Yuasa et al. | |
| 6,845,631 B1 | 1/2005 | Hallin et al. | |
| 6,964,177 B2 | 11/2005 | Lee et al. | |
| 2002/0069654 A1 | 6/2002 | Doi et al. | |
| 2004/0050083 A1 | 3/2004 | Yuasa et al. | |
| 2005/0061016 A1 | 3/2005 | Lee et al. | |
| 2005/0061018 A1 | 3/2005 | Kim et al. | |
| 2005/0132733 A1 | 6/2005 | Rafalovich et al. | |
| 2005/0217310 A1 | 10/2005 | Luehrs et al. | |
| 2007/0163282 A1 | 7/2007 | Cushman et al. | |

OTHER PUBLICATIONS

Partial International Search Report for PCT/US2010/024718, dated Jan. 21, 2011, 2 pages.

* cited by examiner

*Primary Examiner* — Cheryl J Tyler
*Assistant Examiner* — Melanie Phero
(74) *Attorney, Agent, or Firm* — Pearne & Gordon LLP

(57) ABSTRACT

A refrigeration system is provided with an ice maker chamber within a fresh food compartment. The refrigeration system includes a refrigeration path and an ice maker path. The ice maker path includes an electronic expansion valve for controlling the refrigerant entering an ice maker evaporator and an evaporator pressure regulator. Controlling the refrigeration system includes the steps of sensing a first refrigerant temperature at an exit of the ice maker evaporator and controlling a first control of the electronic expansion valve until the temperature reaches a temperature target. The method of controlling can further include comparing a slope of the temperature to at least one of a minimum, a target, or a maximum setting to adjust the control. Subsequently, a second control for the electronic expansion valve can be repeatedly adjusted by evaluating the first refrigerant temperature and the slope.

27 Claims, 9 Drawing Sheets

FRESH FOOD ICE MAKER CONTROL

BACKGROUND OF THE INVENTION

The present invention relates generally to an ice making assembly. In particular, the invention relates to an ice making assembly, and associated refrigeration system, for a refrigeration appliance such as a domestic refrigerator that has both a freezer compartment and a fresh food compartment, with the ice making assembly being located in the fresh food compartment of the refrigerator.

Refrigeration appliances, such as domestic refrigerators, typically have both a fresh food compartment and a freezer compartment or section. The fresh food compartment is where food items such as fruits, vegetables, and beverages are stored and the freezer compartment is where food items that are to be kept in a frozen condition are stored. The refrigerators are provided with refrigeration systems that maintain the fresh food compartments at temperatures somewhat greater than, or above, 0° C. and the freezer compartments at temperatures below 0° C.

The arrangements of the fresh food and freezer compartments with respect to one another in such refrigerators vary. For example, in some cases, the freezer compartment is located above the fresh food compartment and in other cases the freezer compartment is located below the fresh food compartment. Additionally, many modern refrigerators have their freezer compartments and fresh food compartments arranged in a side-by-side relationship. Whatever arrangement of the freezer compartment and the fresh food compartment is employed, typically, separate access doors are provided for the compartments so that either compartment may be accessed without exposing the other compartment to the ambient air.

The refrigeration systems for such refrigerators usually include an evaporator for the freezer compartment that cools the air in the freezer compartment of the refrigerator to temperatures below zero degrees Celsius. Air movers, such as fans for example, circulate the air in the freezer compartment for the purpose of bringing the cold air into contact with all sections of the freezer compartment.

Refrigerators of the types described often can be provided with units for making ice or ice pieces. The ice making unit is commonly located in the freezer compartment of the refrigerator and manufactures ice by the freezing of water by convection as the cold circulating air in the freezer compartment comes into contact with the water and by conduction as that same cold air cools the ice molds in which the water is held. In some cases, the ice making unit is located in the fresh food compartment. Bins for storing the ice pieces that are made are often included with the ice making units. The ice pieces can be dispensed from the storage bins through a dispensing port in the door that closes the freezer to the ambient air. The dispensing of the ice usually occurs by means of an ice delivery mechanism that extends between the storage bin and the dispensing port in the freezer compartment door.

BRIEF SUMMARY OF THE INVENTION

The following presents a simplified summary of the invention in order to provide a basic understanding of some example aspects of the invention. This summary is not an extensive overview of the invention. Moreover, this summary is not intended to identify critical elements of the invention nor delineate the scope of the invention. The sole purpose of the summary is to present some concepts of the invention in simplified form as a prelude to the more detailed description that is presented later.

In accordance with one aspect of the present invention, a method of controlling a refrigeration system comprises the steps of sensing a first refrigerant temperature at an exit of an evaporator over a first period of time, providing a first valve located at a point before the inlet of the ice maker evaporator, and repeatedly adjusting a first control of a variable degree of opening of the first valve by using the first refrigerant temperature to operate an initial refrigerant loading of the ice maker evaporator. Another step in the method is to compare the first refrigerant temperature to the first period of time to calculate a first slope. The method further includes the step of comparing the first slope to at least one of a first minimum slope setting, a first target slope setting, or a first maximum slope setting to repeatedly adjust the first control of the first valve. The first valve operates at the first duty cycle until the refrigerant at the exit of the evaporator reaches a first refrigerant temperature target.

In accordance with another aspect of the present invention, a method of controlling a refrigeration system comprises the steps of sensing a first refrigerant temperature at an exit of an evaporator over a first period of time, providing a first valve located at a point before the inlet of the ice maker evaporator, and repeatedly adjusting a first duty cycle of a variable degree of opening of the first valve by using the first refrigerant temperature to operate an initial refrigerant loading of the evaporator. Another step in the example method is to compare the first refrigerant temperature to the first period of time to calculate a first slope and to compare the first slope to at least one of a first minimum slope setting, a first target slope setting, or a first maximum slope setting to repeatedly adjust the first control of the first valve. The first valve operates at the first control until the refrigerant at the exit of the evaporator reaches a first refrigerant temperature target. Another step in the example method is to repeatedly adjust a second duty cycle of the opening of the first valve between a fully closed position and a fully open position for operating a post-initial refrigerant loading of the evaporator by evaluating the first refrigerant temperature and the first slope subsequent to the refrigerant at the exit of the evaporator reaching the first refrigerant temperature target and the initial refrigerant loading being completed.

In accordance with another aspect of the present invention, a method of controlling a refrigeration system comprises the steps of sensing a first refrigerant temperature at an exit of an evaporator over a first period of time, providing a first valve located at a point before the inlet of the evaporator, comparing the first refrigerant temperature to the first period of time to calculate a first slope, and repeatedly adjusting a control for a variable degree of opening of the first valve between a fully closed position and a fully open position for operating a post-initial refrigerant loading state of the evaporator by evaluating the first refrigerant temperature and the first slope subsequent to the refrigerant at the exit of the ice maker evaporator reaching a first refrigerant temperature target.

In accordance with another aspect of the present invention, a refrigeration system is provided comprising a fresh food compartment, an ice maker chamber located within the fresh food compartment, a refrigeration path providing cooling in the fresh food compartment, an ice maker path providing cooling for the ice maker chamber, where the refrigeration path and the ice maker path each operate independently. The refrigeration path includes a compressor configured for compressing a refrigerant wherein the compressor has variable speeds, a condenser located downstream from the compressor, a dryer/receiver located downstream from the condenser, a capillary tube located downstream from the dryer/receiver, a heat exchanger located downstream from the capillary tube, a first evaporator located downstream from the heat exchanger where the first evaporator is configured for maintaining a temperature in the fresh food compartment, and an accumulator located downstream from the first evaporator. The compressor is located downstream from the first evaporator. The ice maker path includes the compressor, the condenser located downstream from the compressor, the dryer/receiver, a second capillary tube located downstream from the dryer/receiver, a second heat exchanger located downstream from the second capillary tube, an electronic expansion valve located downstream from the second heat exchanger where the electronic expansion valve is configured to control the refrigerant entering the ice maker path and where the dryer/receiver is configured to send the refrigerant from the condenser into either the first evaporator of the refrigeration path or to the electronic expansion valve of the ice maker path, an ice maker evaporator configured to furnish a cooling effect sufficient to freeze water on an ice-forming element where the ice maker evaporator is located downstream from the electronic expansion valve, a second ice maker evaporator located in the fresh food compartment that is configured to control the temperature of the ice stored in the ice maker chamber, and an evaporator pressure regulator configured to operate the ice maker evaporator at a different temperature and pressure than a temperature and a pressure of the first evaporator where the evaporator pressure regulator is located downstream from the ice maker evaporator. The ice maker evaporator converts the water present in the freezer compartment to ice and the evaporator pressure regulator is located downstream from the ice maker evaporator. The accumulator is located downstream from the evaporator pressure regulator of the ice maker path and the refrigeration path and the ice maker path each operate independently.

BRIEF DESCRIPTION OF THE SEVERAL VIEWS OF THE DRAWINGS

The foregoing and other aspects of the present invention will become apparent to those skilled in the art to which the present invention relates upon reading the following description with reference to the accompanying drawings, in which.

DETAILED DESCRIPTION OF THE INVENTION

Figure 1:
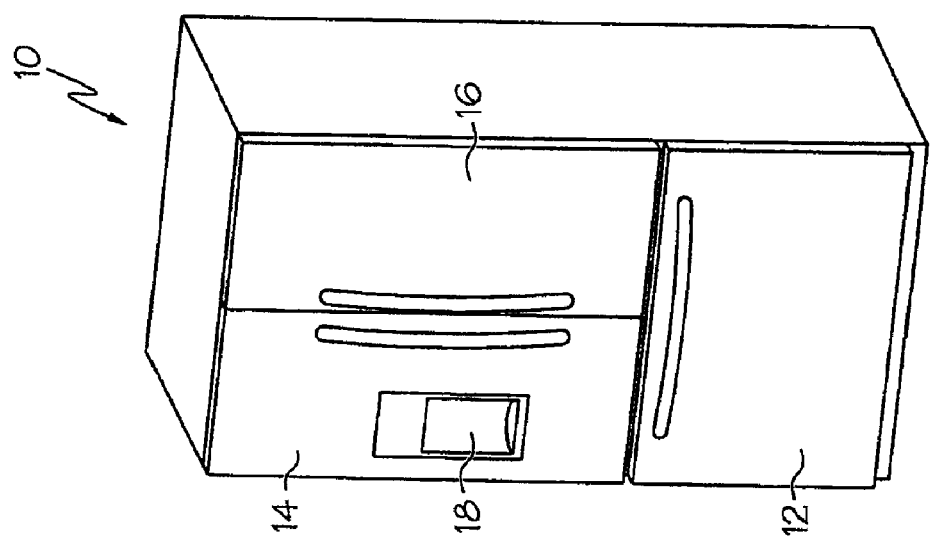
FIG. 1 is a perspective view of a first example of a refrigerator and freezer apparatus.

Examples of embodiments that incorporate one or more aspects of the present invention are described and illustrated in the drawings. These illustrated examples are not intended to be a limitation on the present invention. For example, one or more aspects of the present invention can be utilized in other embodiments and even other types of devices. Moreover, certain terminology is used herein for convenience only and is not to be taken as a limitation on the present invention. Still further, in the drawings, the same reference numerals are employed for designating the same elements.

Figure 8A:
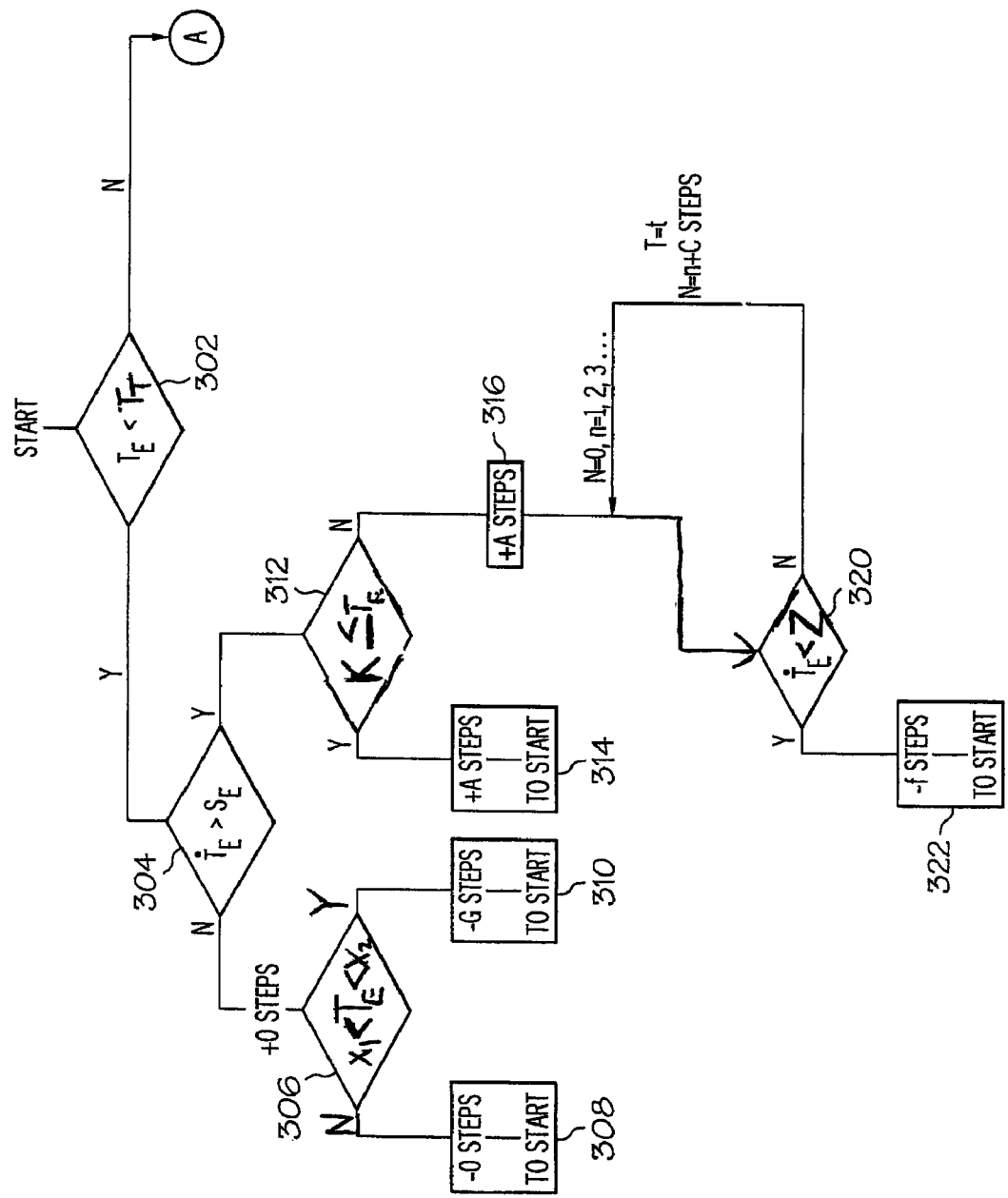
FIG. 8A is an example of an algorithm used to control the refrigerant loading of the ice maker evaporator of FIG. 6.
Figure 8B:
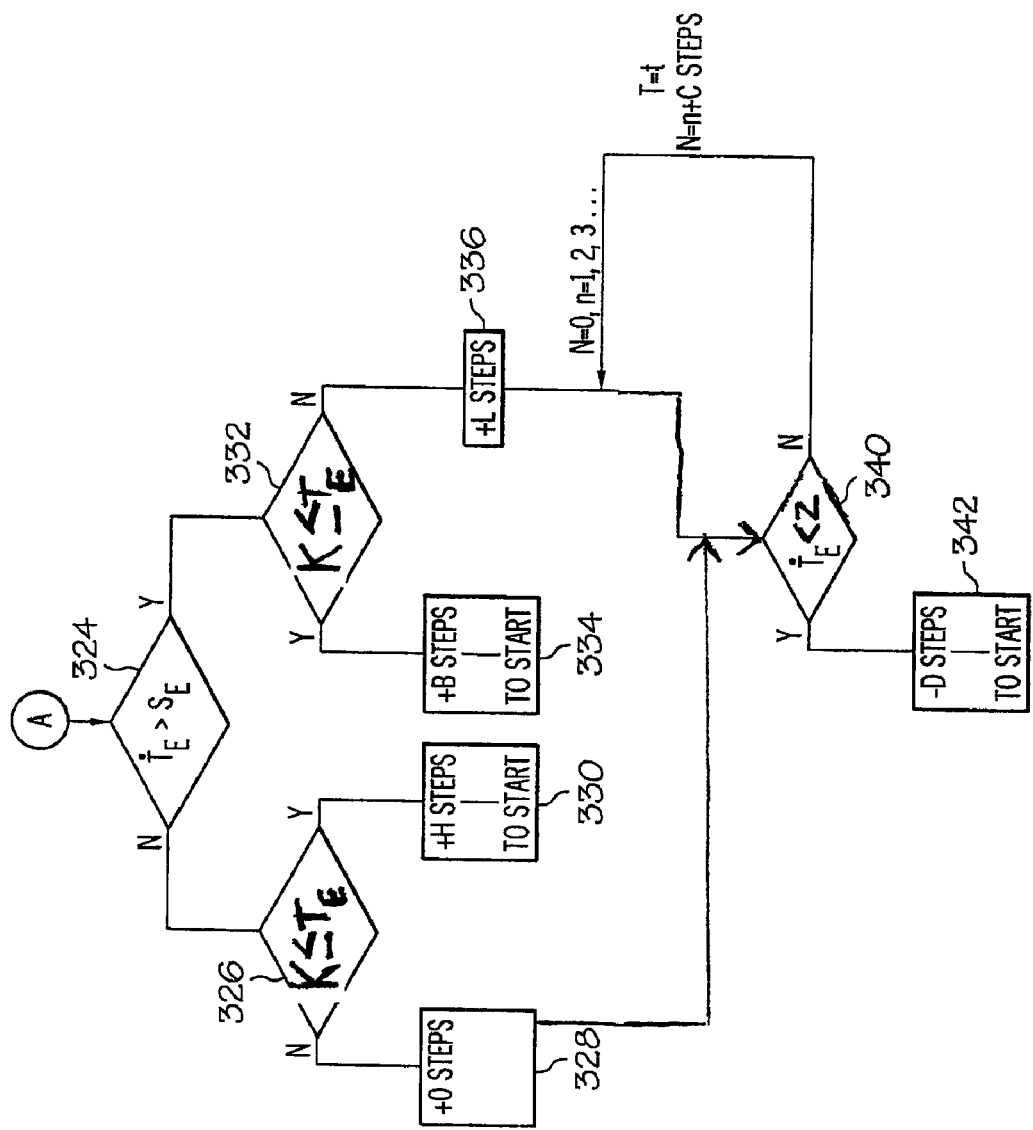
FIG. 8B is a continuation of the algorithm of FIG. 8A that is used to control the refrigerant loading of the ice maker evaporator of FIG. 6.

Referring to FIG. 1 there is illustrated a refrigeration appliance in the form of a domestic refrigerator, indicated generally at 10. Although the detailed description of an embodiment of the present invention that follows concerns a domestic refrigerator, the invention can be employed other than with a domestic refrigerator. An example of one domestic refrigerator is disclosed in application Ser. No. 11/331,732, filed on Jan. 13, 2006, which is hereby incorporated by reference. FIGS. 1-5 illustrate one example refrigerator 10, FIG. 6 illustrates an example schematic of a refrigeration circuit 200 for use with the example refrigerator 10, and FIG. 8A and FIG. 8B illustrates an example algorithm for controlling part of the refrigeration circuit 200.

In addition to being capable of being used with refrigeration appliances other than domestic refrigerators, the present invention can be employed with various types of domestic refrigerators and the use of the present invention is not limited to domestic refrigerators of the type specifically shown in FIGS. 1-5. The refrigeration circuit and the algorithm can be installed in various types of appliances with various locations for ice chambers. For example, the invention can be used in connection with a refrigerator that has the freezer compartment located in the upper portion of the refrigerator above the fresh food compartment that is located in the lower portion of the refrigerator. Additionally, the invention can be applied to a so-called side-by-side refrigerator where the freezer compartment is located on one side of the refrigerator and the fresh food compartment is located on the opposite side of the refrigerator. Typically, in the latter case, when facing the front of the refrigerator, the freezer compartment is located on the left-hand side of the refrigerator and the fresh food compartment is located on the right-hand side of the refrigerator, although the location of the freezer and fresh food compartments are reversed in some cases. The invention, including the methods of controlling, can be used in any fresh food compartment. The invention can further be used in a single door appliance that includes internally divided sections that individually can function as a fresh food section and a freezer section.

The refrigerator 10 in the example of FIG. 1 includes a freezer compartment 12 or section located in the lower portion of the refrigerator, access to which is had through a door. The freezer compartment 12 is used to freeze and/or maintain articles of food stored in the freezer compartment in a frozen condition. For this purpose, the freezer compartment is maintained at a temperature of 0° C. or less in a manner described below. A fresh food compartment 14 is located in the upper portion of the refrigerator 10 in this example. Access to the fresh food compartment is had through the double doors, or French doors 16. The fresh food compartment 14 serves to keep articles of food stored in the fresh food compartment 14 from spoiling by maintaining the articles of food cool but at a temperature somewhat above zero degrees Celsius so as not to freeze the articles of food. Water and ice can be dispensed through a recessed opening, or port 18 located in the door 16.

Figure 2:
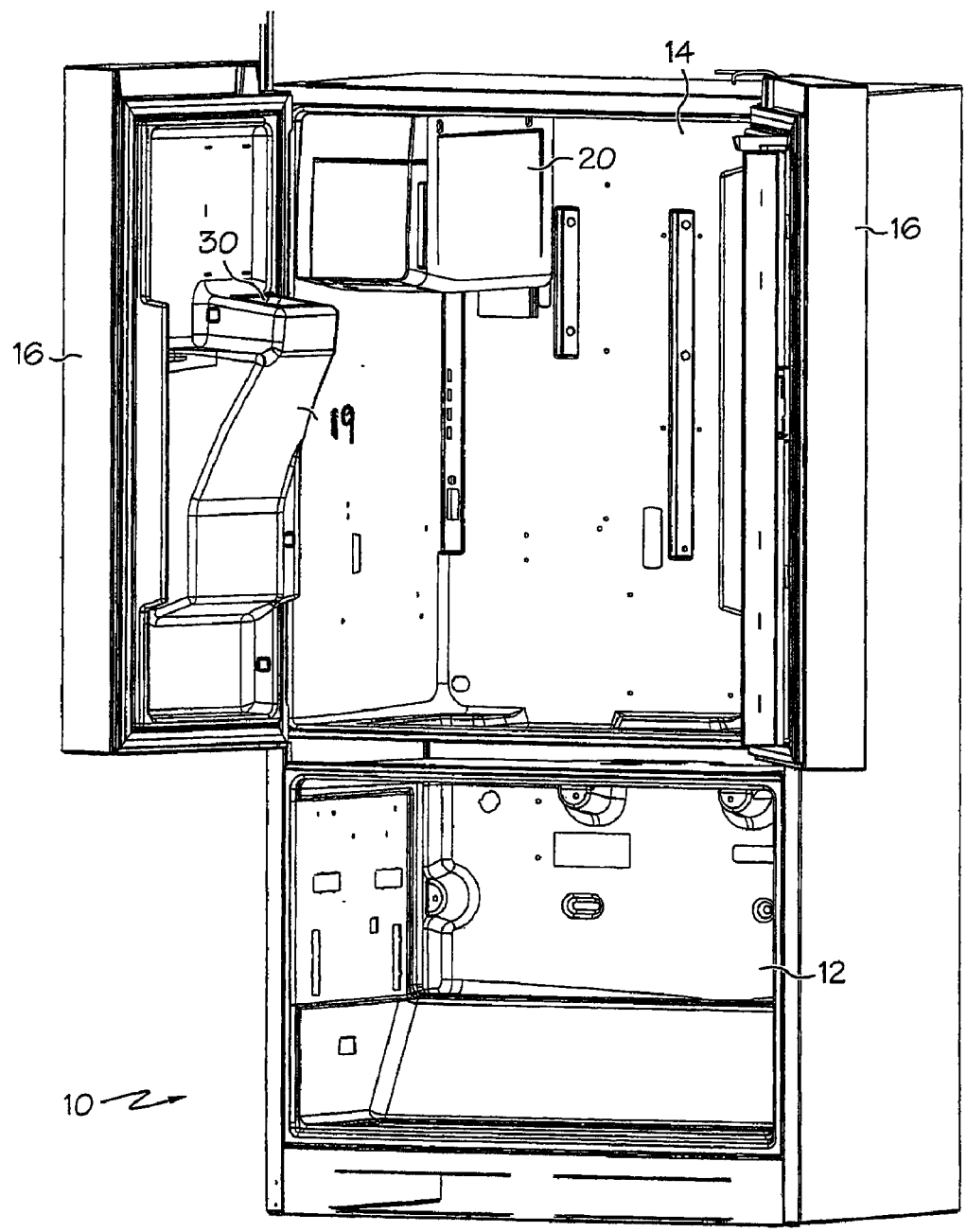
FIG. 2 is a perspective view of the first example of FIG. 1 where the doors of a refrigerator compartment are open and an ice chamber is shown.

Turning to FIG. 2, an embodiment of the refrigerator 10 with the doors 16 of the fresh food compartment opened is shown. The freezer compartment 12 and a fresh food compartment 14 are shown. In this embodiment, the freezer compartment 12 is bottom-mounted but other configurations of the compartments, such as top-mounted freezers and side-by-side refrigerators, are also possible. The top-mounted fresh food compartment 14 has French doors 16 on a user side of the refrigerator 10 and is configured with a water and ice assembly that dispenses ice and water through one of the doors 16 of the fresh food compartment 14. The water and ice assembly comprises a dispenser 19, the port 18, a chute 30, a water supply assembly (not shown) and an ice chamber 20. The water supply assembly, which comprises a water tank, a water filter and solenoid valves, supplies water to the dispenser so that water can be provided directly to a user or, alternatively, to an ice maker in the ice chamber 20 so that the water can be dispensed in the form of ice. Alternatively, various food storage drawers can be provided across the width or depth of the compartments. In addition to the drawers for storing items of food, the fresh food compartment can have shelves for the placement of food items.

Again with reference to FIG. 2, the ice chamber 20 can be secured within the fresh food compartment in any suitable manner. The ice chamber 20 can be equipped with insulation and can be sealed or can allow air in the chamber to communicate with the fresh food compartment. Thus, the temperature of the air in the ice chamber can be above 0° C. The ice chamber 20 can be insulated through a variety of ways such as by adhering foams on surfaces of the ice chamber 20 or by constructing the ice chamber 20 of material having insulating characteristics.

Figure 3:
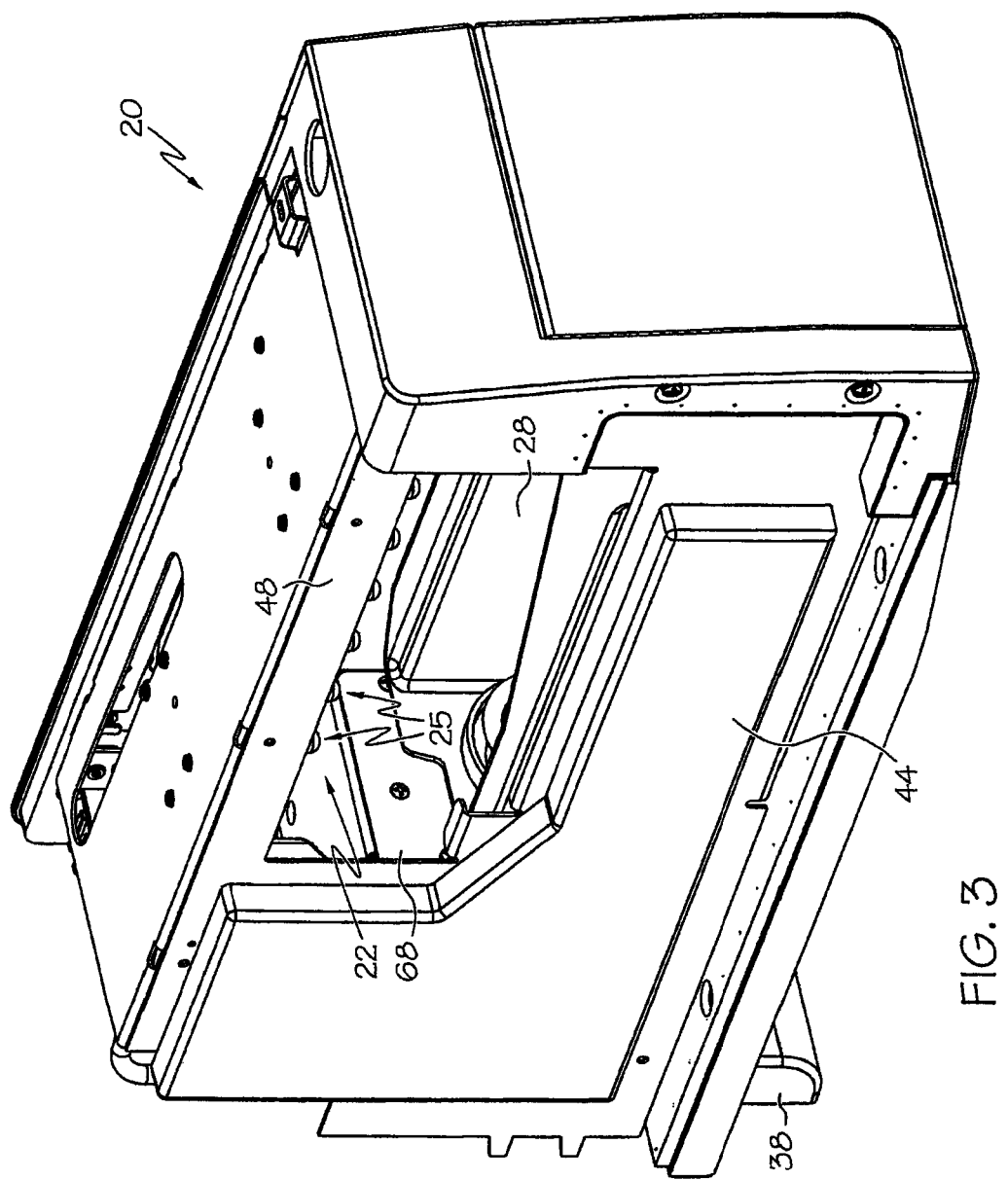
FIG. 3 is a perspective view of the ice chamber of FIG. 2 that includes the ice-making assembly.

As shown in FIG. 3, an ice making assembly 22 can be located near a top of the ice chamber 20. The ice chamber 20, located within the fresh food compartment 14, houses the ice making assembly 22 and provides separation from the environment of the fresh food compartment 14. The ice maker assembly 22 may be located near a top of the ice chamber 20 and may mainly comprise a ice maker evaporator 218 (FIG. 5A), an ice mold 26 (FIG. 5B) that can be located within the ice maker assembly 22, and a water filling mechanism for filling the ice mold 26 with water. The ice maker evaporator 218 is in fluid communication with a refrigerant loop of the refrigerator 10. In this embodiment shown, the ice maker evaporator 218 is of a type with ice-forming elements 25 or fingers. The ice-forming elements 25 can reach into slots of the ice mold 26 and form partially hollow ice pieces referred to as "ice cubes" despite their non-cubic shape. The ice can form on the ice-forming elements 25 from the inside-out as opposed to being formed by being subjected to the air in the storage compartment. Alternately, the ice maker evaporator 218 may be of a type that is at a distance from the ice mold 26 and does not come in direct contact with the water in the ice mold 26. In such embodiments, the ice chamber 20 may include an ice-making air moving apparatus for blowing air by the ice maker evaporator 218 toward the ice mold.

As shown in FIG. 3, the ice chamber 20 also can house an ice container or bin 28 to which ice cubes produced by the ice maker assembly 22 is moved for storage. The ice chamber 20 may also include a heating element for heating the ice mold to facilitate removal or harvest of the ice cubes from the ice mold and a mechanism for removing the ice cubes from the ice container 28 such as by rotating the ice mold so that the ice cubes are dropped into the ice container 28. The ice container 28 may also be configured with an auger (not shown) to generate movement of ice cubes out of the ice container 28 and to the dispenser 19.

Figure 4:
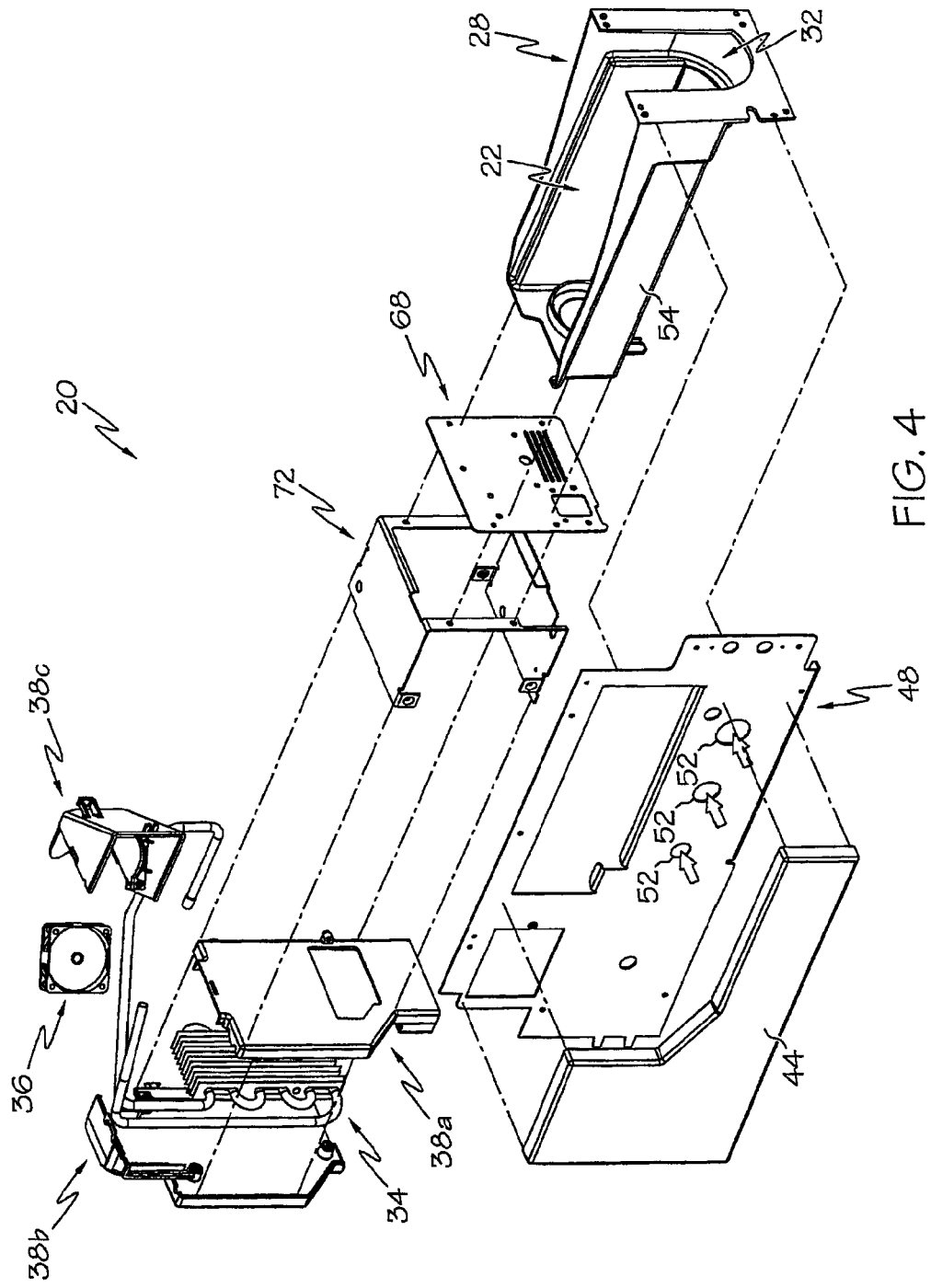
FIG. 4 is an assembly diagram of the first example of the refrigerator of FIG. 1.

As shown in FIG. 4, the ice container 28 includes an opening 32 that is located at the front of the ice chamber 20 and leads to the chute 30 (FIG. 2) which communicates with the dispenser port 18 (FIG. 1) on one of the French doors 16. A user may request ice in any of several ways such as by pressing a cup against a lever that activates operation of the auger or by pushing a button on a user control panel. Moreover, the ice maker assembly 22 may be configured so as to detect the amount of ice in the ice container 28 and to automatically refill the ice container 28 to a predetermined or selected level.

A storage evaporator 34 and a storage air moving apparatus 36 may be provided to control the temperature of ice in the ice container 28. The temperature of the ice in the ice container 28 is affected by the above-freezing temperature of the fresh food compartment 14. The storage air moving apparatus 36 is an axial fan in this embodiment but may include any other means of generating air flow. The storage evaporator 34 and the storage air moving apparatus 36 may be located inside or adjacent to the ice chamber 20. The storage evaporator 34 may be part of a refrigerant loop of the refrigerator 10. Unlike the ice maker evaporator 218 though, the storage evaporator 34 is provided for the purpose of controlling the temperature within the ice chamber 20 while the ice maker evaporator 218 is primarily provided for the purpose of making the ice for the ice chamber 20. The refrigerator 10 can also include an additional unit heat exchanger, such as an evaporator, that is provided to control the temperature of the freezer compartment 12 and the fresh food compartment 14.

As shown in FIG. 4, the storage evaporator 34 and the storage air moving apparatus 36 may be provided at the rear of the ice chamber 20. A first wall 68 and a frame 72 are provided to house an auger motor. The storage evaporator 34 and the storage air moving apparatus 36 may be enclosed within a rear duct structure 38 comprising duct elements 38a, 38b, 38c, as shown in FIG. 3. The auger motor can also be further bounded by the duct element 38a.

An air channeling plate 48 can be placed in the ice chamber 20 so that the vents 52 are located adjacent an exterior surface of the ice container 28. In this embodiment, the air channeling plate 48 is substantially parallel to the exterior surface 54 so that air out of the vents 52 impinges in a substantially perpendicular manner with respect to the exterior surface of the ice container 28. This embodiment of an air delivery housing 44 has three vents 52 that are circular and increase in size toward the port 18 of the refrigerator 10. Therefore, more air is likely to impinge against the ice container 28 at the front than the rear of the ice container 28. The vents 52 may vary in number, shape, size and arrangement and accomplish varying effects of air flow. For example, a plurality of vents 52 across the air channeling plate 48 means that air can be scattered across the exterior surface. Also, if the vents 52 are scattered lengthwise about the exterior surface, air impinging against the ice container 28 can be spread evenly across the exterior surface.

The ice making assembly 22 can be operationally associated with the port 18 by means of the chute 30 for dispensing water and ice from the ice making assembly to the port 18 (see FIG. 1) when the door 16 is closed. As shown in FIG. 2, the chute 30 is mounted to the side of the double door 16 that faces the interior of the fresh food compartment 14 when the door 16 is closed and includes an opening for receiving water as is described below. The chute 30 has an opening for receiving ice from the ice making assembly 22. In the embodiment shown in the drawings of FIG. 2, the ice chamber 20 can be secured to the fresh food compartment by many different structures, such as slotted rails that are fastened to the rear wall and complementary hooks on the back of the ice making assembly.

Figure 5A:
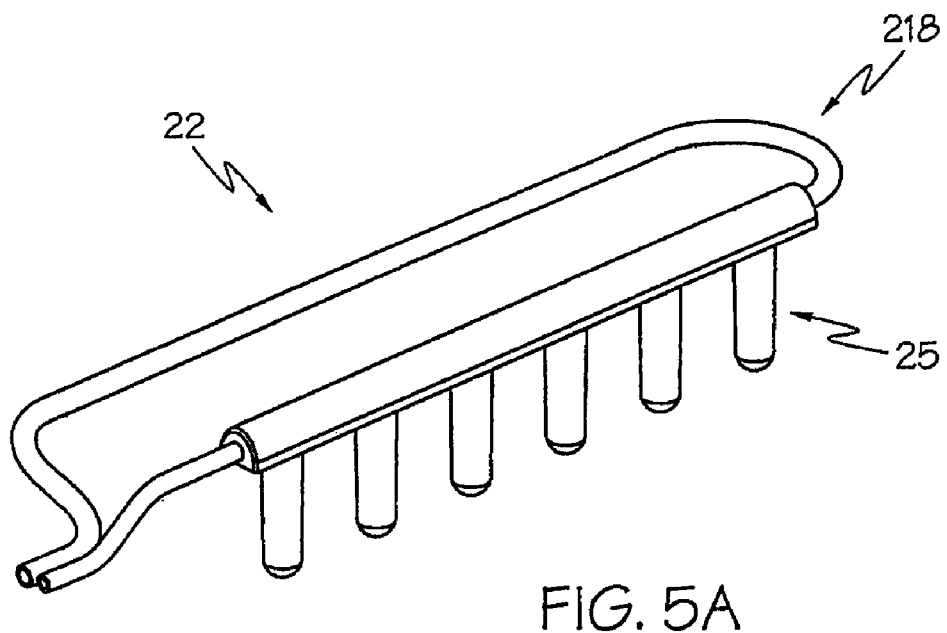
FIG. 5A is a perspective view of a plurality of ice-forming elements of the ice-making assembly of FIG. 3.
Figure 5B:
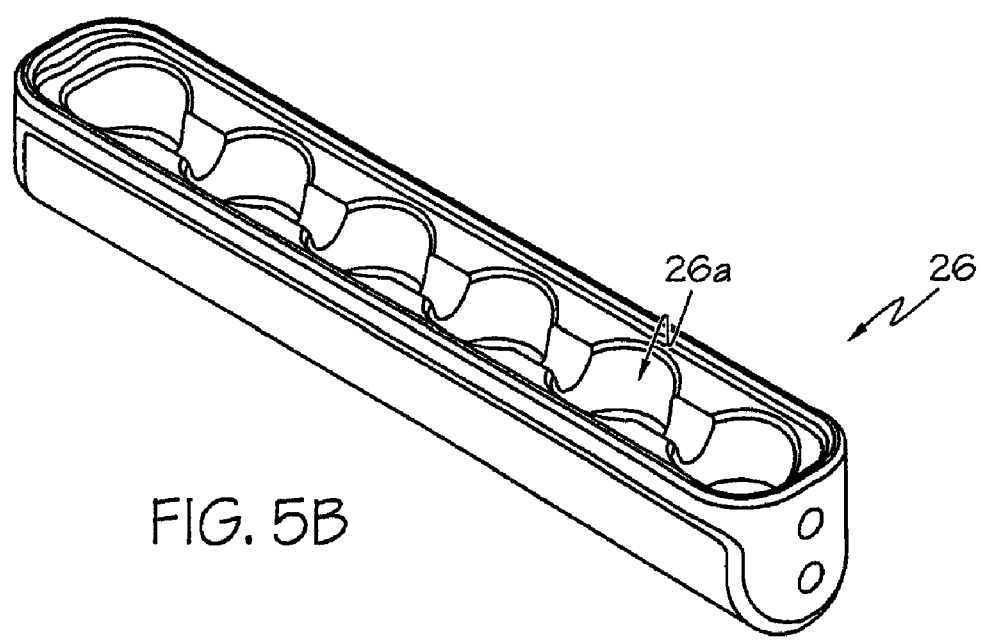
FIG. 5B is a perspective view of an ice mold for use with the ice-making assembly shown in FIG. 5A.
Figure 6:
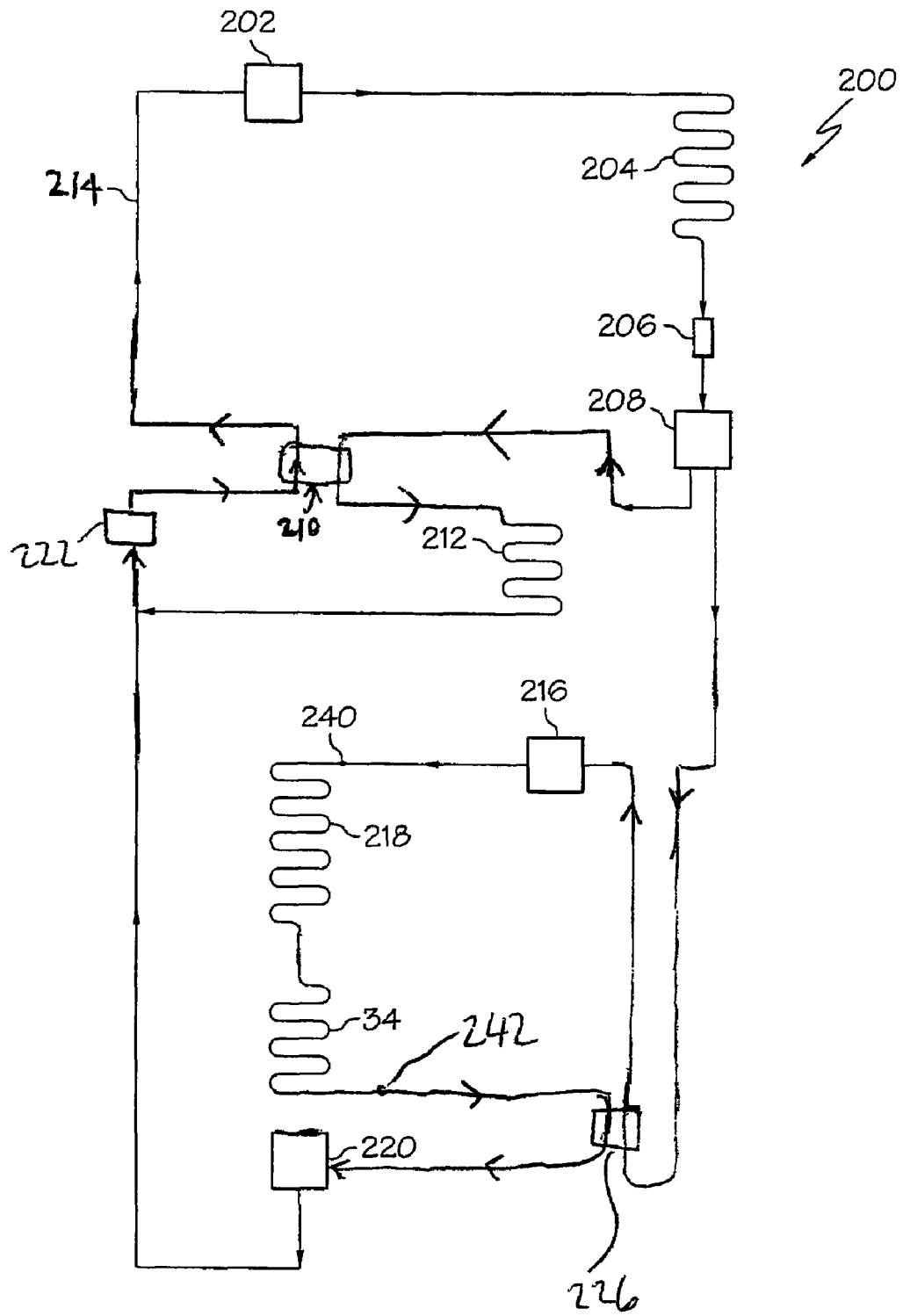
FIG. 6 is a schematic diagram of a first embodiment of a refrigeration system that can be employed with the ice-making assembly of FIG. 3.

Referring to FIGS. 5A and 5B, the ice mold 26 can be provided to define the shape of the ice being formed on the ice-forming elements 25. In other examples, the ice-forming elements 25 can be arranged in other amounts of rows, such as two rows, and can be configured to be formed into a series of cube shapes or other shaped objects. As indicated above, the ice-forming elements 25 can be made of a material, such as stainless steel, that is resistant to corrosion and capable of transmitting heat and cold. The ice-forming elements 25 can be constructed in a manner that the refrigerant flows internally of at least a portion of each element or the elements can comprise solid sections of the heat-transferring material in heat transfer relationship with the tubing and refrigerant therein. The elements are adapted to be operatively associated with the refrigeration system in a manner that a cooling effect may be transmitted to the elements for the formation of ice pieces in the enclosed space defined by the ice container 28 and a heating element can be provided, such as in the manifold of the ice-forming elements. The heating element can apply heat by direct conduction or by heating the ice maker evaporator. The heating element transmits heat to the ice-forming elements 25 for freeing the ice pieces from the ice-forming elements 25. The ice-forming elements 25 can be supported by a hollow tubing to receive refrigerant. In this regard, the hollow tubing and the ice-forming elements 25 can thereby constitute the ice maker evaporator 218, shown in FIG. 6, whereby the ice-forming elements 25 are cooled sufficiently for the ice pieces to be formed on the ice-forming elements 25 and subsequently heated, such as by a heating element, to break the bond by which the ice pieces adhere to the ice-forming elements 25. As a result, the ice pieces fall to a collection area or are placed in the ice mold 26. In other examples, the heating element can be placed in other locations and is not limited to the one location on the ice-forming elements 25.

The heating element can be activated automatically, at set intervals, or on demand by a user when additional ice is desired. The heating element can be activated to release ice cubes in response to a user pushing a cup against a paddle or in response to activation of a button on the exterior of the refrigerator. When the user requests ice, such as by pressing a cup against a lever that activates operation of the auger, the speed of the compressor can be adjusted as the heating element can be activated to release additional amounts of ice. The speed of the compressor 202 can be increased, such as to a speed of 2350 RPM or an increase of 500 RPM-700 RPM, for a certain time period, such as 20 seconds, when the heating element is activated.

It is appreciated that the ice making assembly 22 can be oriented from a left to a right side of the refrigerator or that the ice making assembly 22 can be oriented between the front and the back of the refrigerator 10. Other orientations and locations are also possible. The ice making assembly 22 can also be located in various vertical portions of the ice chamber 20.

A control panel can also be provided within or on an exterior of the refrigerator 10 that is operationally associated with various control units and devices in the refrigerator. For example, the control panel can be used to provide input or control information to a microprocessor, not shown, that controls the operation of various components in the refrigerator including the ice making assembly of the invention. Thus, the user can adjustably control various operational features of the refrigerator at the control panel. The functioning of the microprocessor is also responsive to condition-sensing devices, such as thermostats, located in the refrigerator.

In another example of an appliance, the fresh food compartment 14 of the refrigerator also can include a panel that is provided with a plurality of openings through which air from the freezer compartment 12 can flow. An air mover, such as a fan, can move air from the freezer compartment 12 through a duct and behind the panel so that air flows through the opening and the openings in the panel to the fresh food compartment 14. Return ducts can be provided to allow air from the fresh food compartment 14 to return to the freezer compartment. The freezer compartment 12 and the fresh food compartment 14 are thus in fluid communication with one another whereby air can be circulated between the freezer compartment 12 and the fresh food compartment 14.

As shown in FIG. 6, an operation of a fresh food ice maker assembly includes an example refrigeration circuit 200 that can be used with the example refrigerator shown in FIGS. 1-5. It is appreciated that other types of refrigerators can be used with the example refrigeration circuit 200. The example refrigeration circuit 200 can freeze water into ice using a refrigeration circuit in the fresh food compartment 14 of an appliance. The refrigerator-freezer can be configured to operate according to the demand for both an ice chamber 20 of the fresh food compartment 14 and the remaining portions of the fresh food compartment 14 as supplied by the refrigeration circuit. In addition, the example refrigeration circuit 200 can be used in combination with the ice maker evaporator 218 and the storage evaporator 34.

With the inclusion of an ice maker refrigerant flow path coupled with an existing refrigeration path, the refrigeration circuit 200 can operate according to the demand setting of both the ice chamber 20 and the remaining portions of the fresh food compartment 14. The refrigeration circuit 200 can be designed to control the flow of refrigerant and the temperature of the ice maker evaporator 218 as well as the storage evaporator 34. The ice maker path can provide cooling in the fresh food compartment 14, including the production of ice in the fresh food compartment 14, and can communicate with the ice chamber 20 in the fresh food compartment 14. While the ice maker path and the refrigeration path can be in communication, the refrigeration path and the ice maker path can each operate independently. The ice making assembly 22, shown in FIGS. 2-3, can be enabled to operate in cooperation with the refrigerator operation or without disturbing the refrigerator operation while maintaining the cooling of the freezer compartment 12 and the fresh food compartment 14.

The refrigeration path can provide cooling in the fresh food compartment. The refrigeration path within the refrigeration circuit 200, in this example, includes a compressor 202, a condenser 204, an eliminator tube 206, a dryer/receiver 208, a capillary tube with a first heat exchanger 210, a first evaporator 212, and an accumulator 222, and a suction line 214 connecting the first evaporator 212 to the compressor 202. The compressor 202 can have variable speeds that can control the amount of refrigerant being pumped through the refrigeration path. The first evaporator 212 can be used for the purpose of providing a cooling effect and maintaining the temperature in the fresh food compartment and the freezer compartment. The dryer/receiver 208 can be provided and located downstream from the condenser 204 and upstream from the first evaporator 212. A capillary tube can be located before the heat exchanger 210 in the refrigeration path downstream from the dryer/receiver 208.

The ice maker path within the refrigeration circuit 200 can include the same compressor 202, the same condenser 204, the same eliminator tube 206, the same dryer/receiver 208, a second capillary tube with a second heat exchanger 226, an electronic expansion valve 216, an ice maker evaporator 218, a storage evaporator 34, an evaporator pressure regulator 220, the same accumulator 222, and the suction line 214 connecting the accumulator 222 to the compressor 202. The ice maker path can communicate at least in part with the ice chamber of the fresh food compartment and can furnish a cooling effect sufficient to freeze water in the ice chamber which is in the fresh food compartment. A second capillary tube can be located before the second heat exchanger 226 in the ice maker path downstream from the dryer/receiver 208. The evaporator pressure regulator 220, located downstream from the compressor 202, is configured to operate the ice maker evaporator 218 at a different temperature and pressure than the temperature and pressure of the first evaporator 212. The evaporator pressure regulator 220 is located downstream from the compressor 202 and is connected to a point after an exit 242 of the ice maker evaporator 218 and the storage evaporator 34 and allows the first evaporator 212 to operate at an operating temperature and pressure that maintains a desired refrigerator temperature. It is appreciated that in other examples, the temperature can be sensed at other locations, such as a point between the ice maker evaporator 218 and the storage evaporator 34. It is also appreciated that the controls can be used with a single evaporator in the ice maker path. The evaporator pressure regulator 220 can close or restrict the fluid flow path from the ice maker evaporator 218 back to the compressor 202. The ice maker evaporator 218 can operate at different temperatures and pressures than the first evaporator 212 to convert water into ice as the ice maker evaporator 218 is configured to furnish a cooling effect sufficient to freeze water present in the ice chamber 20. The accumulator 222 can be configured to control the amount of refrigerant returning to the compressor 202. The accumulator 222 receives refrigerant from both the refrigeration path and the ice maker path. Thus, the accumulator 222 is located downstream from the evaporator pressure regulator 220 of the ice maker path and the accumulator 222 can also be located downstream from the first evaporator 212. The dryer/receiver 208 can also be in the ice maker path as it is located downstream from the condenser 204 and upstream from the electronic expansion valve 216. The dryer/receiver 208 can be configured to send the refrigerant from the condenser 204 into either the first evaporator 212 of the refrigeration path or the electronic expansion valve 216 of the ice maker path.

The electronic expansion valve 216 is configured to control the flow of refrigerant entering the ice maker path and specifically the refrigerant entering an evaporator, which in this example is the ice maker evaporator 218 and the storage evaporator 34. Efficient control of the electronic expansion valve 216 allows the refrigeration path and the ice maker path to operate independently of one another. A control for an opening of the electronic expansion valve 216, as well as the operation of the compressor 202, can be repeatedly adjusted to change the amount of refrigerant flowing through the ice maker evaporator 218 based on the cooling load required. The control can correspond to a duty cycle for repeatedly adjusting the opening of the first valve, such as adjusting the amount of time that the valve is opened or closed. The control can also correspond to repeatedly adjusting the degree of opening of the valve, such as between a plurality of positions between a fully closed position and a fully open position. The electronic expansion valve 216 can be located at a point before an inlet 240 of the ice maker evaporator 218 so the refrigerator can operate at its desired state. It is desirable to avoid changing the operation of the compressor 202 while the electronic expansion valve 216 is used to account for the needs of the ice maker evaporator 218. A control signal can be used to control the opening of the electronic expansion valve 216, also referred to as the first valve. An example method can be used to operate an initial refrigerant loading of the ice maker evaporator 218 and/or the storage evaporator 34 by repeatedly adjusting a first control of the electronic expansion valve 216. The first control can be used to efficiently take the refrigerant at the exit 242 to a target temperature. Proper initial refrigerant loading is desired for when the refrigerant after the exit 242 of the ice maker evaporator 218 and the storage evaporator 34 has not yet reached its target temperature. The example method efficiently controls metering of the refrigerant in the refrigeration system and the ice making assembly. Thus, the example method provides an efficient way to bring the ice maker evaporator 218 and/or the storage evaporator 34 to the target temperature below the freezing point of water, such as 0° C.

The ice making assembly can include a first heat exchanger 210 and a second heat exchanger 226 shown in FIG. 6 that can be located downstream from the dryer/receiver 208. The heat exchangers 210, 226 are provided for ensuring that the refrigerant is in the proper state and temperature when the refrigerant reaches the first evaporator 212, the ice maker evaporator 218, and when the refrigerant reaches the compressor 202. In one example, the second heat exchanger 226 can be placed before the inlet to the electronic expansion valve 216 and can also include a portion of the connection between the exit from the storage evaporator 34 and the evaporator pressure regulator 220. Activation of the heat exchanger 226 on the refrigerant leaving the ice maker evaporator 218 helps to ensure that gas returns to the compressor 202.

A temperature control for the refrigeration path of the refrigeration circuit can be provided to manage the refrigeration path with or without the ice maker operating. An ice maker control is a separate control that manages the ice maker function only. The ice maker control can operate the ice making process with a strictly timed based refrigerant flow control without any feedback from the refrigeration cycle. Alternatively, the ice maker control can also operate the ice making process based on the evaporator temperature providing temperature feedback control within a cycle time. Thus, the ice maker control can operate the ice release by either a strictly timed-based control or by using evaporator temperature feedback control.

An example method of controlling the refrigeration system of FIG. 6 can be provided where the example method can be used with the example refrigerator of FIG. 1 or with other example appliances. The example method for the initial loading of refrigerant includes the step of sensing a first refrigerant temperature $T_E$ at the outlet 242 of the ice maker evaporator 218 and the storage evaporator 34 over a first period of time. The first refrigerant temperature $T_E$ can be determined by use of a temperature sensor placed at or near the outlet 242 of the ice maker evaporator 218 and the storage evaporator 34. The measured temperature is sent to a controller. The controller can then read or sense the outlet or first refrigerant temperature $T_E$ once per second or at some other interval. The first control can be operated at different intervals and can be repeatedly adjusted, such as at an adjustment response time of 10 seconds, to respond to changes in the conditions. Many different intervals can be used for the first control. For example, the temperature can be sensed multiple times per second and then an average can be computed for each second. In other examples, the interval can be adjusted depending on the operation of the appliance such that the control adjusts more frequently or less frequently.

When the control includes a duty cycle, this corresponds to the amount of time that the electronic expansion valve 216 is open in addition to the control of the opening of the valve. For example, the first duty cycle can be operated at a first range, such as between a first minimum duty cycle of 0.02 and a first maximum duty cycle of 0.10, where the valve is activated or in an open-state between 2% and 10% of the time. In further examples, the example method can include the step of sensing a second refrigerant temperature $T_I$ at the inlet 240 of the ice maker evaporator 218 over a second period of time such as 10 seconds. The first refrigerant temperature $T_E$ and the second refrigerant temperature $T_I$ can be used to operate an initial refrigerant loading of the ice maker evaporator 218 and/or the storage evaporator 34 by repeatedly adjusting a first control of the electronic expansion valve 216. In any of the examples, the first control can be increased if the temperature at the exit 242 is greater than a first target temperature, such as negative 4° C. In other examples, the first control can be increased if the first slope of the first refrigerant temperature measured over time at the exit 242 is greater than a first target slope temperature over time, such as −1.67° C./second.

Figure 7:
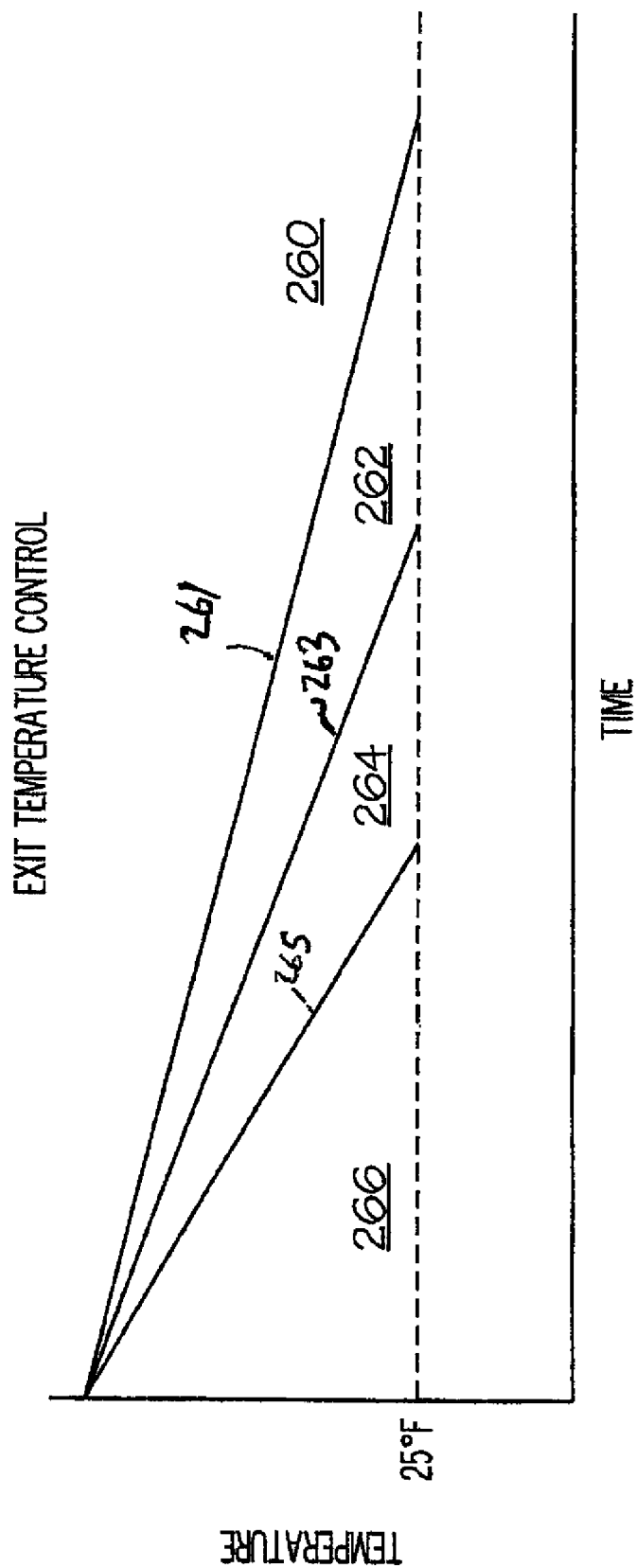
FIG. 7 is a graph illustrating the refrigerant temperature at the exit of the ice maker evaporator of FIG. 6 in comparison to time.

In FIG. 7, an example of the exit temperature control is shown. The exit temperature control can monitor a first slope of the temperature of the refrigerant at the exit of the evaporator. The evaporator can include the ice maker evaporator 218 and the storage evaporator 34. The first slope represents the change of the exit temperature over time and can be charted as a function of temperature and time. The first slope is then compared to at least one of a first minimum slope setting, a first target slope setting, and a first maximum slope setting. In the example method, four different regions 260, 262, 264, 266 are provided on FIG. 7 corresponding to four different scenarios based on the comparison of the first slope to a first minimum slope setting 261, a first target slope setting 263, and a first maximum slope setting 265. The first control can evaluate the first refrigerant temperature $T_E$, the first slope, the first minimum slope setting 261, the first target slope setting 263, and the first maximum slope setting 265 to provide adjustments to the first control, where the first control is repeatedly adjusted by increasing or decreasing in varying amounts in response to the difference between the first slope and the first target slope setting 263, when the first refrigerant temperature at the exit has not year reached a first refrigerant temperature target. If the first slope equals the first target slope setting 263, then no adjustment of the first control is required by the example method. After each adjustment in slope, 10 seconds can elapse for the response to occur.

The first region 260 represents that the control can increase the first control when the cooling rate is too small. The first minimum slope setting 261 represents the minimum amount of temperature loss per second that the exit 242 of the evaporator should be operating at. The first region 260, corresponds to the situation where:

First Slope<First Minimum Slope Setting.

For example, if the first slope is less than the first minimum slope setting 261, such as a minimum negative slope of 1.11° C./sec, then this signifies that the first slope is located in the first region 260. Thus, if the first slope is in the first region 260, this signifies that the cooling of the refrigerant at the ice maker evaporator 218 is occurring at an undesirably slow rate, such as a loss of 0.50° C./sec. In response to the first slope being less than the first minimum slope setting 261, the control will increase the first control by an amount. When the first slope is in the first region 260, if the first control includes a duty cycle, the first control can be increased 0.03 every 10 seconds until it reaches the first maximum duty cycle, which in one example can be 0.10. Many different values can be used for the first minimum slope setting, the first target slope setting, the first maximum slope setting, a first maximum duty cycle, and a first minimum duty cycle.

The control of a degree of opening of the electronic expansion valve 216 can be adjusted between a fully open position, various intermediate positions, and a fully closed position. In one example, a stepper motor can be used to control the opening of the electronic expansion valve 216 during the first position between a fully closed position, such as a 0 position, a fully open position, such as a 180 position. Other values representing various positions can also be used. During operation of the ice maker evaporator 218 and/or the storage evaporator 34, the opening of the valve 216 can fluctuate between a range of positions, such as between a range of 50 positions. In this example, when the first slope is less than the first minimum slope setting 261, this can cause the valve to be opened by an additional amount of 2, 3, or 5.

The second region 262 represents that the control can increase the first control when the cooling rate is slightly too small. The first target slope setting 263 represents a target amount of temperature loss per second that the ice maker evaporator 218 should be operating at. The second region 262, corresponds to the situation where:

First Minimum Slope Setting<First Slope<First Target Slope setting.

For example, if the first slope is greater than the first minimum slope setting 261 and the first slope is less than the first target slope setting 263, such as a negative target slope of 1.67° C./sec, then this signifies that the first slope is located in the second region 262. Thus, if the first slope is in the second region 262, this signifies that the cooling of the refrigerant at the ice maker evaporator 218 or the storage evaporator 34 is occurring at a slightly undesirably slow rate, such as a loss of 1.30° C./sec, but the ice maker is still cooling at a faster rate than a slope in the first region 260. In response to the first slope being not less than the first minimum slope setting 261 and less than the first target slope setting 263, the control will increase the first control by a second amount, which is less than the amount of increase corresponding to the first slope being in the first region 260. When the first slope is in the second region 262, the first control of the electronic expansion valve 216 can be increased, such as by +0.01 every 10 seconds, if the first control includes a duty cycle, until it reaches the first maximum duty cycle, which in one example can be 0.10. In the example where the 0 position represents the fully closed position and the 180 position represents the fully open position, the first control can open the valve by a variable degree in the additional amount of 1 step when the first slope is greater than the first minimum slope setting 261 and the first slope is less than the first target slope setting 263.

The third region 264 represents that the control can decrease or not adjust the first control when the cooling rate is slightly too great. The first maximum slope setting 265 represents a maximum amount of temperature loss per second that the ice maker evaporator 218 should be operating at. The third region 264, corresponds to the situation where:

First Target Slope Setting<First Slope<First Maximum Slope Setting.

For example, if the first slope is not less than the first target slope setting 263 and the first slope is less than the first maximum slope setting 265, such as a negative target slope of 2.22° C./sec, then this signifies that the first slope is located in the third region 264. Thus, if the first slope is in the third region 264, this signifies that the exit of the ice maker is cooling down at a slightly undesirable fast rate, such as 2.00° C./sec, such that the first control can be decreased or not adjusted. In response to the first slope being not less than the first target slope setting 263 and less than the first maximum slope setting 265, the control will decrease the first control by a third amount. When the first slope is in the third region 264, the first control of the electronic expansion valve 216 can be decreased, such as by −0.01 every 10 seconds if the first control includes a duty cycle, until it reaches the first minimum duty cycle, which in one example can be 0.02. In other examples, the first control of the electronic expansion valve 216 can be not adjusted if the first slope is in the third region 264. In the example where the 0 position represents the fully closed position and the 180 position represents the fully open position, the first control can close the valve by a variable degree, such an additional amount 1. Alternatively, the first control can cause the valve to not be adjusted at all, when the first slope is not less than the first target slope setting 263 and the first slope is less than the first maximum slope setting 265.

The fourth region 266 represents that the control can decrease the first control when the cooling rate becomes too great. The fourth region 266, corresponds to the situation where:

First Maximum Slope Setting<First Slope.

For example, if the first slope is not less than the first maximum slope setting 265, then this signifies that the first slope is located in the fourth region 266. Thus, if the first slope is in the fourth region 266, this signifies that the exit of the ice maker is cooling down at an undesirable fast rate, such as 3.00° C./sec, such that the first control should be decreased. In response to the first slope being not less than the first maximum slope setting 265, the control will decrease the first control by a fourth amount. The fourth amount can represent a greater decrease in the first control than the third amount. When the first slope is in the fourth region 266, the first control of the electronic expansion valve 216 can be decreased, such as by −0.03 or −0.02 every 10 seconds if the first control includes a duty cycle, until it reaches the first minimum duty cycle, which in one example can be 0.02. In the example where the 0 position represents the fully closed position and the 180 position represents the fully open position, the first control can close the valve an additional amount 2 when the first slope is not less than the first maximum slope setting 265.

In other examples, additional settings can also be provided such that the example method can include any plurality of slope settings to produce more than four regions that can be compared with the first slope to provide varying levels of adjustment for the first control. The first control can further include the step of sensing the second refrigerant temperature $T_I$ at the inlet 240 of the ice maker evaporator 218 over the second period of time. In another example, the first control can first be adjusted in response to the second refrigerant temperature $T_I$ at the inlet 240 by evaluating the slope at the inlet in comparison to a variety of settings and then subsequently, the first control can be adjusted in response to the first refrigerant temperature $T_E$ in the manner described above.

An example method of operating the ice maker can include repeatedly adjusting a second control used to operate a post-initial refrigerant loading state of an evaporator, such as an ice maker evaporator and a storage evaporator. The second control can correspond to a duty cycle for repeatedly adjusting the opening of the first valve, such as adjusting the amount of time that the valve is opened or closed. The second control can also correspond to repeatedly adjusting the degree of opening of the valve, such as between a plurality of positions between a fully closed position and a fully open position. The second control, also referred to as the steady state, can be activated subsequent to the exit 242 of the ice maker evaporator 218 and the storage evaporator 34 reaching the first refrigerant temperature target (e.g. a temperature below 0° C. such as negative 4° C.) and the initial refrigerant loading operation being completed, shown at least in FIG. 7. The second control provides a minimization control to efficiently control the evaporator, which can include the ice maker evaporator 218 and the storage evaporator 34. The first refrigerant temperature target, such as negative 4° C., can be the same as the target temperature in the first control or can be a different value, such as negative 9° C., as the ice maker evaporator 218 will now be used to continually produce ice. Thus, this additional step of repeatedly adjusting a second control can be used to control the second control of the electronic expansion valve 216 upon the refrigerant at the exit 242 of an evaporator reaching a target temperature below the freezing point of water to reach a new target temperature further below the freezing point of water. The second control can also be used regardless of how the refrigerant is initially loaded into the ice maker evaporator or regardless of how a first target temperature is reached. Accordingly, an example method can also be provided for repeatedly adjusting a control of a variable degree of opening of the first valve for operating a post-initial refrigerant loading state of the ice maker evaporator. This example method can include increasing the control, decreasing the control, non-adjustments of the control, and activating reload subroutines of the second control in response to various conditions indicating the performance of the first refrigerant temperature $T_E$ over time.

The control of an opening of the electronic expansion valve 216 during the steady state can also be adjusted between a fully open position, various open and closed positions, and a fully closed position. The post-initial control can also include the example of a stepper motor being used to control the opening of the electronic expansion valve 216 between a 0 position and a 180 position wherein the 0 position represents that the valve is fully closed and the 180 position represents that the valve is fully open. Other values representing various positions can also be used.

The second control can be repeatedly adjusted in response to the first refrigerant temperature $T_E$ and the first slope $\dot{T}_E$. Additional data can be used to determine the second control such as the use of various minimum, target, and maximum settings. Further examples can also use the second refrigerant temperature $T_I$, measured at the inlet 240 of the ice maker evaporator 218. An example algorithm can also be used to control the second control, as discussed with regards to FIG. 8A and FIG. 8B. The example algorithm can also be used to adjust compressor speed to change the flow of refrigerant to the ice maker evaporator 218. For example, when ice is needed to be produced, the compressor speed can be increased from 1800 RPM to 2700 RPM to operate the ice maker evaporator 218 in addition to the unit evaporator 212. The example control algorithm can adjust the second control by adjusting the on-time of the electronic expansion valve 216 to supply an increased rate of flow or a decreased rate of flow of refrigerant to the ice maker evaporator 218. Increasing the second control refers to increasing the flow rate of refrigerant. The example methods of control for the first control and the second control of the first valve can be used in combination with appliances that include a fresh food compartment and a freezer compartment, in appliances where there is airflow communication between the fresh food compartment and the freezer compartment, and in appliances where a fresh food compartment is provided with an ice chamber, as described with regards to FIG. 2.

A variety of parameters and variables can be evaluated by the algorithm to control the second control. One of the goals of controlling the second control is to efficiently control the flow of refrigerant, to efficiently use energy, and to reach a steady state where the control of the valve does not have to be adjusted. In the example shown, the parameters used include the first refrigerant temperature $T_E$ measured at the exit 242 of the ice maker evaporator 218 and the storage evaporator 34, the first refrigerant target temperature, the first slope $\dot{T}_E$, and a second target slope setting $S_E$. The first refrigerant target temperature can be a temperature below 0° C. such as −9° C. and the first refrigerant target temperature represents the desired temperature of the refrigerant at the exit of the ice maker evaporator 218 and the storage evaporator 34. The second target slope setting $S_E$ represents a desired temperature change per unit of time as measured at the outlet 242 of the ice maker evaporator 218 and the storage evaporator 34. The second target slope setting $S_E$ for the second control can be a slightly positive number, so as to not require that the second control of the valve is always in an open state, such as 0.02. In other examples, the second refrigerant temperature at the inlet 240 can also evaluated.

The example algorithm can also include at least one reload subroutine, represented as beginning at either item 316 on FIG. 8A or at items 328 or 336 on FIG. 8B, that can be activated to quickly increase the control of the electronic expansion valve 216 when the control determines that the first refrigerant temperature $T_E$ is at risk of increasing too quickly based on the change in the first refrigerant temperature $T_E$ over time. The reload subroutine can cause multiple increases to the second control to inhibit the first refrigerant temperature $T_E$ of the ice maker evaporator from deviating greatly from the target temperature and to quickly get the refrigerant at the ice maker evaporator 218 to a desired operating temperature. In a further example, the algorithm can also be used to adjust compressor speed to change the flow of refrigerant to the ice maker evaporator 218.

A goal of controlling the second control is to reach a steady state that is represented in this example by item 308 in FIG. 8A. The steady state in this example can refer to the state of the open position of the valve reaching a relatively constant position while still producing ice at the ice maker evaporator 218 and operating the unit evaporator 212. A controller for the refrigerator can apply the steps shown in the diagram of FIG. 8A and FIG. 8B on a regular interval of time, such as every 30 seconds. The representation of the example control algorithm in FIGS. 8A and 8B conceptually shows a reduced increase in the second control each time that the conditions result in a branch on the left of an item being selected, rather than a branch on the right of an item. Thus, the second control can be increased upon any detection of the first refrigerant temperature $T_E$ being less than the first refrigerant temperature target. The second control can also be increased upon any diction that the first slope $\dot{T}_E$ is greater than a second target slope setting. This algorithm is only one example algorithm that can be used to adjust and regulate the second control. Similar algorithms can be made using different values for the variables.

When the first refrigerant temperature $T_E$ itself is above the first refrigerant target temperature, a larger increase to the control can be applied by the example algorithm. A larger increase to the control occurs on FIG. 8B than in any point on FIG. 8A because FIG. 8B represents every scenario where the first refrigerant temperature $T_E$ is greater than the target temperature of −9° C. This means that the control for the ice maker evaporator 218 needs to be increased to ensure that freezing conditions continue to be reproduced.

If the first slope $\dot{T}_E$ is not greater than the second target slope setting $S_E$, this signifies that the ice maker evaporator 218 is cooling faster than the second target slope setting $S_E$ and that there is less of a need for an increase in the second control. This evaluation is represented by items 304, 324 and when the first slope $\dot{T}_E$ is not greater than the second target slope setting $S_E$, the algorithm can either not adjust the second control or even decrease the control. The conditions represented by items 306, 326 correspond to lesser increases in the second control than the increases that would be needed if the first slope $\dot{T}_E$ was greater than the second target slope setting $S_E$. If the first slope $\dot{T}_E$ was greater, this would mean that the first refrigerant temperature $T_E$ was not increasing too quickly so a generally larger increase in the second control could be required.

An additional evaluation of the conditions of the second control can be made, as represented by items 306, 326. For example, item 306 can represent the additional evaluation of whether the first refrigerant temperature is within a range between a first constant X1 and a second constant X2. In these conditions, the second control of the electronic expansion valve 216 is not adjusted when it is outside the range between the first constant X1 and the second constant X2, as represented by item 308. If the first refrigerant temperature $T_B$ is below this range, such as at negative 12° C., this represents that the first refrigerant temperature $T_E$ is already at a desired temperature and is cooling at a proper rate. The first refrigerant temperature $T_B$ will seldom be in this range for very long, as heat from the air, the water, and the ice mold will increase the first refrigerant temperature $T_B$. If the first refrigerant temperature $T_E$ is above this range, such as at 10° C., this represents that the first refrigerant temperature $T_B$ is already at a desired temperature.

In one example, the first constant X1 can be approximately −19° C. and the second constant can be approximately −12° C. In another example, a first set of values for the first constant and the second constant can be designated if the first valve is at a range of closed positions, such as between a 0 and a 70 position. The first constant can be equal to approximately −19.4° C. and the second constant can be equal to approximately −12.2° C. in the first set of values. A second set of values for the first constant and the second constant can be designated if the first valve is at a range of intermediate positions, such as between the 70 and a 130 position. A third set of values for the first constant and the second constant can be designated if the first valve is at a range of open positions, such as greater than the 130 position.

If the first refrigerant temperature $T_E$ is within the range between the first constant X1 and the second constant X2, it represents that the first refrigerant temperature $T_E$ is at a temperature even cooler than that is necessary and the second control can be decreased by some amount G, as represented by item 310. The control can be decreased because the additional energy needed to continually reduce the refrigerant temperature at the outlet is not necessary. In other examples, the control can simply decrease the control or not adjust the control upon reaching item 306 where the first slope is not greater than the second target slope setting.

In one example, G can represent 1, 2, or 3 steps being decreased from the second control. The algorithm can also use different values for G based on the position of the opening of the valve. For example, if the first valve is at a range of closed positions, such as less than or equal to a 70 position, the value of G can be 1, because the valve is already closer to being fully closed. If the first valve is at a range of intermediate positions, such as greater than the 70 position and less than or equal to a 130 position, the value of G can be 2, because the valve is further from being fully closed. If the first valve is at a range of open positions, such as greater than the 130 position, the value of G can be 3, so that the valve will more quickly reach a fully closed position.

An additional evaluation can be made by the control where a third constant K is compared to the first refrigerant temperature $T_E$, as represented by item 326. Other evaluations can be made at this juncture. The third constant K can be representative of the superheat relationship between the exit and the inlet of the evaporator. In one example, the constant K can correspond to negative 1.11° C. If the third constant K is not less than the first refrigerant temperature $T_E$, the second control of the electronic expansion valve 216 can remain not adjusted. In the example shown as represented by item 328, when the third constant K is not less than the first refrigerant temperature $T_E$, a reload subroutine can be activated to either quickly decrease the first refrigerant temperature $T_E$ or to decrease the control itself, as represented by item 342. When the first slope $\dot{T}_E$ is greater than a second target slope setting $S_E$, this suggests that the temperature will be decreasing properly soon. However, the first refrigerant temperature $T_E$ is already at a lower temperature than the third constant K. This indicates that the reload subroutine can be activated to determine if the control should be increased or decreased. In this example, the first slope $\dot{T}_E$ has already been determined as being less than an increase of 0.02° C. per unit of time, the value of the second target slope setting $S_E$. Thus, the first slope $\dot{T}_E$ could currently indicate a value that is less (e.g. negative 1° C. per unit of time) which will indicate that the first refrigerant temperature $T_E$ is moving to the target temperature $T_T$ at a faster pace. The conditions suggest that the first refrigerant temperature $T_E$ will soon be below −9° C. Instead of increasing the control, the first slope $\dot{T}_E$ could also be less than the fourth constant Z, the evaluation represented by item 340. As a result, the control will instead decrease the degree of opening by an amount D, as represented by item 342, without increasing the control. It is possible that the first slope $\dot{T}_E$ could also be greater than the fourth constant Z, such as −0.01, which then would properly call for an increase in the control, and the control can be increased by an amount C. By providing a reload subroutine for the conditions represented by item 328, this prevents excess operation of the ice maker by checking to determine if an increased control is needed. The control can return to the first evaluation, represented by item 302 on FIG. 8A, after either a number of loops in the reload subroutine are performed or after the first slope $\dot{T}_E$ is less than the fourth constant Z, such as negative 0.01.

If the third constant K is less than or equal to the first refrigerant temperature $T_E$, the second control of the electronic expansion valve 216 is increased, as represented by item 330, because the first refrigerant temperature $T_E$ is decreasing at a higher rate than the second target slope setting but the first refrigerant temperature $T_E$ is not yet at a lower temperature than the third constant K. For example, the third constant K can be approximately negative 1° C. If the first refrigerant temperature $T_E$ is negative 0.5° C., this indicates that the first refrigerant temperature $T_E$ can use an increase in the control to reach its target temperature, which in this example is negative 9° C., as stated earlier. The second control of the electronic expansion valve 216 can be increased by some amount H, as shown at item 330. In one example, the value of H can represent a 2 step increase in the control. The second control can be increased in this example to efficiently and more quickly reach the target temperature of negative 9° C.

When the first slope $\dot{T}_E$ of the exit temperature is greater than the second target slope setting $S_E$, this indicates that the temperature at the exit 242 will not be decreasing as fast as desired over time and that an increase in the second control is needed. The second control can further determine the magnitude of the increase to the second control. A further evaluation of the conditions of the second control can be made as represented by items 312, 332. An evaluation can be made between the first refrigerant temperature $T_E$ and the third constant K to determine the magnitude of the increase in the second control. The third constant K can be representative of the superheat relationship between the exit and the inlet of the evaporator. In one example, the constant K can correspond to negative 1.11° C. If the first refrigerant temperature $T_E$ is greater than the third constant K, then the second control can be increased by some amount A, as represented by item 314. The value of A can have a value of 0 or 1 steps as an increase. In this example, the evaluation represented by item 312 is optional. The selection of negative 9° C. for the target temperature $T_T$ and the selection of negative 1° C. for the third constant will result in the first refrigerant temperature $T_E$ always being less than the third constant K if the first refrigerant temperature $T_E$ is indeed less than the target temperature $T_T$, as represented by items 302 and 312. Other values can be selected for the third constant if desired to provide a difference in the adjustment of the control.

An increase in the control is provided when the first refrigerant temperature $T_E$ is above the first refrigerant target temperature $T_T$, when the first slope $\dot{T}_E$ of the exit temperature is greater than the second target slope setting $S_E$, and when the first refrigerant temperature $T_E$ is greater than the third constant K as represented by item 334. The increase can be in the amount of B, which can have a value of a 2 or 3 step increase. In one example, the first refrigerant temperature $T_E$ can have a value of negative 0.5° C. which is greater than the negative 1° C. value of the third constant. The increase provided by B is provided to help the first refrigerant temperature $T_E$ reach the target temperature.

A reload subroutine, as described above, can be activated to quickly increase the control of the electronic expansion valve 216 when the control determines that the first refrigerant temperature $T_E$ is at risk of increasing too quickly. In one example of the conditions that would activate a reload subroutine, the reload subroutine can be activated when the first refrigerant temperature $T_E$ is less than the first refrigerant temperature target $T_T$, when the first slope $\dot{T}_E$ is greater than a second target slope setting $S_E$, and when the first refrigerant temperature $T_E$ is less than a third constant K, as represented by items 302, 304, and 312. In another example of the conditions that would active a reload subroutine, the reload subroutine can be activated when the first refrigerant temperature $T_E$ is less than the first refrigerant temperature target $T_T$ and when the first slope $\dot{T}_E$ is greater than a second target slope setting $S_E$, as represented by items 302, 324, and 332. No additional evaluation is needed in this example to activate a reload subroutine. Thus, the reload subroutine, represented by items 316, 320, 322 or by items 336, 340, and 342, can be activated whenever the first slope $\dot{T}_E$ is greater than a second target slope setting $S_E$ to ensure that the control is increased until the first slope $\dot{T}_E$ reaches or surpasses the second target slope setting $S_E$.

The reload subroutine can start with increasing the control by an amount A, as represented by item 316. A can have a value of 0 or 1 steps. In another example of the conditions that would activate a reload subroutine, the reload subroutine can be activated when the first refrigerant temperature $T_E$ is greater than the first refrigerant temperature target $T_T$, when the first slope $\dot{T}_E$ is greater than a second target slope setting $S_E$, and when the first refrigerant temperature $T_E$ is less than a third constant K, as represented by item 332. The reload subroutine can start with increasing the control by an amount L, as represented by item 336. L can have a value of 2 steps, such that the position between 0 and 180 is increased by 2.

The reload subroutine can then be activated, as represented by the loop after item 316 including items 320 and 322 and as represented by the loop after item 336 and including items 340 and 342. Running the reload subroutine, upon reaching the conditions represented by the eighth item 316 or item 336, repeatedly increases the second control by some amount C after the initial increase of A or L. The initial increase of A or L is optional for the reload subroutine.

A rapid increase in the second control, by way of a reload subroutine, can be activated by the algorithm based on the conditions represented by item 302, 304, and 312 or 302, 324, and 332, because the first slope $\dot{T}_E$ is greater than the second target slope setting $S_E$ indicating that the first refrigerant temperature $T_E$ at the exit 242 of the ice maker evaporator is not decreasing at a desirable rate. Without an increase in the control, the evaporator temperature will not fluctuate efficiently and the first refrigerant temperature $T_E$ could even increase, as indicated by the slope not reaching the second target slope setting. The control can further include an evaluation that the first refrigerant temperature $T_E$ is still not less than the third constant K before activating the reload subroutine. The optional evaluation of the first refrigerant temperature $T_E$ relative to the third constant K represents a checkpoint that the first refrigerant temperature $T_E$ will soon be at a desired temperature. Accordingly, if the reload subroutine is not activated and the evaluation between the third constant K and the refrigerant temperature $T_E$ is made, the control can be increased by a first amount represented by items 314, 334 which can be different in value than a second amount represented by items 316, 336 if the reload subroutine is needed. The first amount can be greater than the second amount, as the third constant K can be equal to negative 1° C. If the refrigerant temperature $T_E$ is greater than the third constant in this example, this can indicate that the ice maker evaporator 218 just started operating, that the temperature may be slowly decreasing, and that an initial increase of the first amount should be made before activating a reload subroutine.

The reload subroutine can be initiated on an interval that is shorter than the interval for the entire algorithm. For example, the algorithm can be initiated every 30 seconds but the reload subroutine can be activated every 10 seconds such that a rapid increase in the second control can be achieved. The reload subroutine, which adds an amount C to the second control every 10 seconds, can be deactivated when the first slope $\dot{T}_E$ is less than a fourth constant Z, such as negative 0.01. This condition can indicate that the slope of the first refrigerant temperature $T_E$ is negative. This condition deactivates the reload subroutine because it indicates that the rate of temperature change is once again negative or is once again below a desired level set by the fourth constant Z. The reload subroutine can also be deactivated after a certain amount of times that the control is increased by C, such as three times. In addition, the example control can include an additional adjustment by decreasing the control by a value F or D upon deactivation of the reload subroutine. In one example, the values of F or D can represent a decrease in the control by 1, 2, 3, or 4 steps. This condition is represented by items 322, 342. The control can be decreased because the control can be very high after the reload subroutine has completed its operation. The example control can then assess the conditions to determine again if the first refrigerant temperature $T_E$ is below the first refrigerant target temperature of −9° C., as represented by item 302.

The third constant K can also have a number of different values depending on the position of the valve. For example, if the first valve is at a range of closed positions, such as less than or equal to a 70 position, the value of K can be designated as a first value, such as less than negative 1.11° C., because the valve is already closer to being fully closed. When the value of K is much less than negative 1.11° C., this creates a greater chance of increase by the first amount, represented by items 314 and 334. If the first valve is at a range of intermediate positions, such as greater than the 70 position and less than or equal to a 130 position, the value of K can be designated as a second value, such as approximately 1.11° C. When the value of K is approximately 1.11° C., this allows a lesser chance of increasing by the first amount, represented by items 314 and 334. If the first valve is at a range of open positions, such as greater than the 130 position, the value of K can be can be designated as a third value, such as greater than negative 1.11° C., because the valve is already closer to being fully open. When the value of K is greater than negative 1.11° C., this creates a greater chance of the reload subroutine being activated. In the example where the second target slope setting $S_E$ is 0.02, the reload subroutine can only be activated when the first slope $\dot{T}_E$ is greater than 0.02. Thus, the reload subroutine will be activated for a certain number of times, or until the first slope $\dot{T}_E$ is less than the fourth constant Z, such as negative 0.01. Various values for the fourth constant Z can be designated in any of the evaluation of FIGS. 8A and 8B. Alternatively, values of K can be selected to increase the chances of the reload subroutine being activated when the first valve is at a range of open positions and to decrease the chances of the reload subroutine being activated when the first valve is at a range of closed positions.

In an alternative example, the reload subroutine can be deactivated when a calculated derivative $\ddot{T}_E$ of the first slope is less than zero and the first slope $\dot{T}_E$ is less than a fourth constant Z, such as negative 0.01. These two conditions can indicate that not only is the slope of the first refrigerant temperature $T_E$ changing negatively, but that the slope itself is negative. This indicates that the first refrigerant temperature $T_E$ is in fact decreasing and the rate of decrease should be increasing.

The amount that each reload subroutine increases the control can be different amounts. The varying amounts given are by example only. In one example, the amount A that the second control is increased when the temperature at the exit is less than the first target temperature in FIG. 8A can be less of an amount than any of the amounts H, B, or L in FIG. 8B, which are only reached when the temperature at the exit is greater than the first target temperature. Thus, when the first refrigerant temperature $T_E$ itself is above target, a greater control can be applied. The value of B can represent an increase of 2 or 3 steps to the control. The algorithm can also be designed such that the amounts are progressively increasing between A, H, B, and L respectively. Each of the amounts of adjustment of the control (G, A, F, H, B, L, and D) can each be changed in response to the position of the valve between the fully closed position and the fully open position.

The invention can be used with other control algorithms for the refrigerator. For example, an overload control can also be provided that checks for an overload of the system during operation. The overload control can be functioning during either the first control or the second control or during both controls. A control algorithm to ensure that a minimum load is being used by the control can also be operated. The minimum load program can use the same evaluations as the second control, but can use different values for the constants involved. For example, the amount A can be only 2 in some instances, as opposed to 3. The values for D and F, which are the values when deactivating the reload subroutine, can be 4 instead of 1, 2, or 3 such that a greater decrease takes place. The second constant can also be warmer, as it can be negative 9.4° C., as opposed to negative 12° C., and the first constant can also have different values.

The invention has been described with reference to the example embodiments described above. Modifications and alterations will occur to others upon a reading and understanding of this specification. Example embodiments incorporating one or more aspects of the invention are intended to include all such modifications and alterations insofar as they come within the scope of the appended claims.

What is claimed is:

1. A method of controlling a refrigeration system comprising the steps of:
sensing a first refrigerant temperature at an exit of an evaporator over a first period of time;
providing a first valve located at a point before the inlet of the evaporator;
repeatedly adjusting a first control for a variable degree of opening of the first valve by using the first refrigerant temperature to operate an initial refrigerant loading of the evaporator;
comparing the first refrigerant temperature to the first period of time to calculate a first slope;
comparing the first slope to at least one of a first minimum slope setting, a first target slope setting, or a first maximum slope setting to repeatedly adjust the first control of the first valve;
wherein the first valve operates at the first control until the refrigerant at the exit of the evaporator reaches a first refrigerant temperature target; and
repeatedly adjusting a second control for a variable degree of opening of the first valve of the opening of the first valve between a fully closed position and a fully open position for operating a post-initial refrigerant loading state of the evaporator by evaluating the first refrigerant temperature and the first slope subsequent to the refrigerant at the exit of the evaporator reaching the first refrigerant temperature target and the initial refrigerant loading being completed.

2. The method of claim 1, further comprising the step of:
activating a heating element when a release of ice produced by the evaporator is desired.

3. The method of claim 1, further comprising the steps of:
not adjusting the second control of the first valve when the first refrigerant temperature is less than the first refrigerant temperature target, when the first slope is less than a second target slope setting, and when the first refrigerant temperature is within a range between a first constant and a second constant.

4. The method of claim 3, further comprising the steps of:
designating a first set of values for the first constant and the second constant if the first valve is at a range of closed positions;
designating a second set of values for the first constant and the second constant if the first valve is at a range of intermediate positions; and
designating a third set of values for the first constant and the second constant if the first valve is at a range of open positions.

5. The method of claim 3, wherein:
the first constant is equal to approximately negative 19° C. and the second constant is equal to approximately negative 12° C.

6. The method of claim 1, further comprising the step of:
decreasing the variable degree of opening of the second control of the first valve when the first refrigerant temperature is less than the first refrigerant temperature target, when the first slope is less than a second slope setting, and when the first refrigerant temperature is not within a range between a first constant and a second constant.

7. The method of claim 1, further comprising the step of:
increasing the variable degree of opening of the second control of the first valve when the first refrigerant temperature is less than the first refrigerant temperature target and when the first slope is greater than a second target slope setting.

8. The method of claim 1, further comprising the step of:
running a reload subroutine that repeatedly increases the variable degree of opening of the second control;
wherein the reload subroutine is activated when the first refrigerant temperature is less than the first refrigerant temperature target and when the first slope is greater than a second target slope setting;
wherein the reload subroutine is deactivated when the first slope is less than a fourth constant;
wherein the second control is decreased upon deactivation of the reload subroutine.

9. The method of claim 1, further comprising the step of:
increasing the variable degree of opening of the second control of the first valve during the post-initial refrigerant loading state of the evaporator when the first refrigerant temperature is greater than the first refrigerant temperature target.

10. The method of claim 1, further comprising the step of:
running a reload subroutine that repeatedly increases the variable degree of opening of the second control;
wherein the reload subroutine is activated when the first refrigerant temperature is greater than the first refrigerant temperature target; and
wherein the reload subroutine is deactivated when the first slope is less than a fourth constant;
wherein the second control is decreased upon deactivation of the reload subroutine.

11. The method of claim 1, further comprising the steps of:
running a reload subroutine that repeatedly increases the variable degree of opening of the second control;
wherein the reload subroutine is activated when the first refrigerant temperature is greater than the first refrigerant temperature target when the first slope is less than a second target slope setting, and when the first refrigerant temperature is less than a third constant;
designating a first value for the third constant if the first valve is at a range of closed positions;
designating a second value for the third constant if the first valve is at a range of intermediate positions; and
designating a third value for the third constant if the first valve is at a range of open positions.

12. The method of claim 11, wherein the third constant is equal to approximately negative 1° C.

13. The method of claim 1, further comprising the steps of:
increasing the variable degree of opening of the second control of the first valve by a first amount when the first refrigerant temperature is greater than the first refrigerant temperature target, the first slope is greater than a second target slope setting and when the first refrigerant temperature is greater than a third constant; and
increasing the variable degree of opening of the second control of the first valve by a second amount when the first refrigerant temperature is greater than the first refrigerant temperature target, the first slope is greater than the second target slope setting, and when the first refrigerant temperature is less than the third constant.

14. The method of claim 1, further comprising the step of:
running a reload subroutine that repeatedly increases the variable degree of opening of the second control;
wherein the reload subroutine is activated when the first refrigerant temperature is greater than the first refrigerant temperature target, when the first slope is greater than a second target slope setting;
wherein the reload subroutine is deactivated when the first slope is less than fourth constant;
wherein the variable degree of opening of the second control is decreased upon deactivation of the reload subroutine.

15. The method according to claim 1,
wherein the evaporator is a storage evaporator configured to control a temperature within an ice chamber; and
wherein the evaporator is located downstream from an ice maker evaporator that is configured to furnish a cooling effect sufficient to freeze water.

16. A method of controlling a refrigeration system comprising the steps of:
sensing a first refrigerant temperature at an exit of an evaporator over a first period of time wherein the evaporator is configured to furnish a cooling effect sufficient to freeze water;
providing a first valve located at a point before the inlet of the evaporator;
comparing the first refrigerant temperature to the first period of time to calculate a first slope; and
repeatedly adjusting a control for a variable degree of opening of the first valve between a fully closed position and a fully open position for operating a post-initial refrigerant loading state of the evaporator by evaluating the first refrigerant temperature and the first slope subsequent to the refrigerant at the exit of the evaporator reaching a first refrigerant temperature target.

17. The method of claim 16, further comprising the step of:
not adjusting the control of the first valve when the first refrigerant temperature is less than the first refrigerant temperature target, when the first slope is less than a second target slope setting, and when the first refrigerant temperature is within a range between a first constant and a second constant.

18. The method of claim 16, further comprising the step of:
decreasing the variable degree of opening of the control of the first valve when the first refrigerant temperature is less than the first refrigerant temperature target, when the first slope is less than a second target slope setting, and when the first refrigerant temperature is not within a range between a first constant and a second constant.

19. The method of claim 16, further comprising the step of:
increasing the variable degree of opening of the control of the first valve when the first refrigerant temperature is less than the first refrigerant temperature target and when the first slope is greater than a second target slope setting.

20. The method of claim 16, further comprising the step of:
running a reload subroutine that repeatedly increases the variable degree of opening of the control;
wherein the reload subroutine is activated when the first refrigerant temperature is less than the first refrigerant temperature target, when the first slope is greater than a second target slope setting;
wherein the reload subroutine is deactivated when the first slope is less than a fourth constant;
wherein the control is decreased upon deactivation of the reload subroutine.

21. The method of claim 16, further comprising the step of:
increasing the variable degree of opening of the control of the first valve during the post-initial refrigerant loading state of the evaporator when the first refrigerant temperature is greater than the first refrigerant temperature target.

22. The method of claim 16, further comprising the step of:
running a reload subroutine that repeatedly increases the control;
wherein the reload subroutine is activated when the first refrigerant temperature is greater than the first refrigerant temperature target when the first slope is less than a second target slope setting, and when the first refrigerant temperature is less than a third constant; and
wherein the reload subroutine is deactivated when the first slope is less than a fourth constant;
wherein the control is decreased upon deactivation of the reload subroutine.

23. The method of claim 16, further comprising the steps of:
increasing the variable degree of opening of the control of the first valve by a first amount when the first refrigerant temperature is greater than the first refrigerant temperature target, the first slope is greater than a second target slope setting and when the first refrigerant temperature is greater than a third constant; and
increasing the variable degree of opening of the control of the first valve by a second amount when the first refrigerant temperature is greater than the first refrigerant temperature target, when the first slope is greater than the second target slope setting, and when the first refrigerant temperature is less than the third constant.

24. The method of claim 16, further comprising the step of:
running a reload subroutine that repeatedly increases the variable degree of opening of the control;
wherein the reload subroutine is activated when the first refrigerant temperature is greater than the first refrigerant temperature target, when the first slope is greater than a second target slope setting;
wherein the reload subroutine is deactivated when the first slope is less than a fourth constant; and
wherein the control is decreased upon deactivation of the reload subroutine.

25. The method of claim 16, further comprising the steps of:
running a reload subroutine that repeatedly increases the variable degree of opening of the control;
wherein the reload subroutine is activated when the first refrigerant temperature is greater than the first refrigerant temperature target, when the first slope is greater than a second target slope setting, when the first slope is less than a second target slope setting, and when the first refrigerant temperature is less than a third constant;
designating a first value for the third constant if the first valve is at a range of closed positions;
designating a second value for the third constant if the first valve is at a range of intermediate positions; and
designating a third value for the third constant if the first valve is at a range of open positions.

26. The method of claim 25, wherein the third constant is equal to approximately negative 1° C.

27. The method according to claim 16,
wherein the evaporator is a storage evaporator configured to control a temperature within the ice chamber; and
wherein the evaporator is located downstream from an ice maker evaporator that is configured to furnish the cooling effect sufficient to freeze water.

* * * * *